United States Patent Office 3,546,306
Patented Dec. 8, 1970

3,546,306
PRODUCTION OF ALKYLENE DIHALIDES
Donal E. McCarthy, 9104 Chickawane Court,
Alexandria, Va. 22309
No Drawing. Filed Aug. 22, 1967, Ser. No. 662,289
Int. Cl. C07c 17/08
U.S. Cl. 260—663                    5 Claims

ABSTRACT OF THE DISCLOSURE

Process for the production of alkylene dihalides which comprises passing an aliphatic hydrocarbon, such as propane or propylene, a hydrogen halide and an oxygen-containing gas in a reactor having a first portion containing a molecular sieve zeolite alumina silicate catalyst and second and third portions devoid of catalyst, said first and second portions maintained at a temperature of 900° F. to 1100° F., and said third portion maintained at a temperature of about 140° F. to 210° F., wherein intermediate products are not isolated or recovered, and recovering the alkylene dihalides, such as 1,6-dibromohexane, produced.

BACKGROUND OF THE INVENTION

Field of the invention

This invention relates to alkylene dihalides and more more particularly to a new and improved process for the production of alkylene dihalides from hydrocarbons by a single-step synthesis.

Description of the prior art

As is well known, the nylon industry has heretofore assumed a role of vast commercial importance due in large measure to the unique characteristics of polyamide-type resins which render them highly valuable for use in a wide variety of commercial applications. The ever increasing demand for nylon type products has correspondingly initiated widespread commercial demand for the provision of feasible processes for the production of nylon intermediates, especially alkylenediamines. These latter materials are of course basic to the preparation of several grades of nylon and, accordingly, a large measure of industrial research effort has been directed to improve processes for their synthesis in an economical manner.

A primary method by which these alkylene diamines may be synthesized is by ammonolysis of the corresponding alkylene dihalide. This reaction is of course well known and may be carried out in a variety of ways with varying success.

The production of the intermediate alkylene dihalides, however, has not met with a great deal of success. Heretofore, in preparing these materials from basic materials, such as propane or propylene, for example, it has been necessary to resort to a series of separate steps with isolation of each intermediate product and the use of several different types of complex reaction equipment. As is to be appreciated, each of the separate steps of such a reaction requires individual product recovery and isolation steps as well as separate equipment thus militating against the economical feasibility of the process.

It is therefore obvious that the problems presented by the numerous steps required for producing these alkylene diamine intermediates are of long standing in the art and represent a detriment in the overall synthesis of the several grades of nylon.

SUMMARY OF THE INVENTION

Accordingly, it is one object of the present invention to provide a process for the one-step production of alkylene dihalide intermediates which overcomes or otherwise mitigates the problems incurred by art processes.

A further object of the invention resides in the provision of a new and improved process for the production of alkylene dihalides from aliphatic hydrocarbons which have fewer carbon atoms in the aliphatic chain, without the isolation and separation of intermediate products.

A still further object of the present invention resides in the provision of a new and improved process for the one step production of 1,6-dibromohexane by the reaction of propane or propylene with hydrogen bromide and oxygen without the isolation and separate recovery of intermediate products wherein a novel catalyst system is employed.

Other objects and advantages of the present invention will become apparent as the description thereof proceeds.

In accordance with this invention, the above objects and advantages are attained by the provision of a process for the production of an alkylene dihalide which comprises passing an aliphatic hydrocarbon, which has one-half the number of carbon atoms as the final product alkylene dihalide, a hydrogen halide and an oxygen-containing gas, into a reactor having a first portion containing a molecular sieve zeolite alumino silicate catalyst and second and third portions devoid of catalyst, said first and second portions maintained at temperatures of about 900° to 1100° F., and said third portion maintained at a temperature of about 140° to about 210° F., and recovering the product produced.

DESCRIPTION OF THE PREFERRED EMBODIMENTS

According to the present invention it has been surprisingly discovered that a series of reactions employed heretofore to produce alkylene dihalides may be combined into a single step using the novel catalytic system of this invention thus avoiding the required isolation and recovery of intermediate products.

The unique process of the invention employes as primary reactants, an aliphatic hydrocarbon, a hydrogen halide and an oxygen-containing gas.

The aliphatic hydrocarbons employed comprise those of the straight and branched-chain alkane and mono-olefin series having up to about twelve carbon atoms. It will be appreciated of course, that substituents other than carbon and hydrogen may be present therein so long as they are essentially nonreactive and do not deleteriously affect the reaction involved under the conditions employed. Particularly preferred hydrocarbons include those of the alkane series including propane, butane, pentane, etc., as well as olefins such as propylene butylene, etc. Particularly preferred reactants are propane or propylene which produce hexane dihalides.

The hydrogen halide reactant may be any of the hydrogen halides including hydrogen bromide, hydrogen chloride, etc., which is employed as an anhydrous gas. However, hydrogen bromide is the preferred reactant.

The oxygen reactant may be present as free or elemental oxygen or in admixture with inert diluents such as nitrogen as desired. However, molecular oxygen and air represent preferred oxygen sources for the reaction as advantageous results are achieved therefrom.

The novel process of the invention will be described particularly with reference to the reaction of propane, hydrogen bromide and molecular oxygen to produce 1,6-dibromohexane. However it is to be understood that other reactants of the classes set forth hereinabove may also be employed with similar results.

The ratio of reactants employed in the process can be varied from about stoichiometric proportions to an excess of one or more of the reactants. However, in a preferred aspect of the invention, it is contemplated that the reactants be initially employed in about stoichiometric amounts with an additional amount of the hydrogen bromide reactant injected as the reactants enter into the third zone of the reactor.

In carrying out the process, the above identified reactants are charged to a reactor having three distinct reaction zones maintained under separate conditions. This is made necessary by the fact that the theory underlying the process of the invention contemplates three separate reactions performed in situ or in close proximity. The first phase of the process comprises the reaction in an oxy- dehydrobromination zone of the propane, hydrogen bromide and oxygen at high temperatures and in the presence of a molecular sieve zeolite alumino silicate catalyst to produce a mixture of allyl bromide and propylene which then react in the second zone via a coupling effect to produce 1,5-hexadiene. In the third zone, the 1,5-hexadiene from the second zone then reacts at lower temperatures with the hydrogen bromide present in the presence of the oxygen to produce the desired 1,6-dibromohexane which is recovered from the gases exiting the reactor.

A particularly advantageous feature of the invention resides in the novel catalyst system which is employed in the initial zone or portion of the reactor. This catalyst system comprises molecular sieve zeolite alumino silicates which have been found surprisingly effective in promoting the reaction of the aliphatic hydrocarbon hydrogen halide and oxygen to initially form an allylic halide such as allyl bromide.

Molecular sieves in their various forms have been known for some time, primarily as adsorbent materials by reason of their ability to absorb certain materials to the exclusion of others because of their pore sizes, and the art is replete with adsorbent reactions of this type. Therefore it was surprising to find that certain molecular sieve zeolites would catalyze the reaction of this invention with superior results.

The molecular sieve zeolite alumino silicates which have been found suitable to catalyze the process of this invention are those which have pore sizes ranging from about 6 to 15 angstrom units, with a preferred catalyst having pore sizes of about 10 to 13 angstrom units. It is also preferable that the silicon/aluminum ratio be in a ratio of about 1.2 to 2.5. These materials are generally commercially available.

A molecular sieve zeolite material, which has been found particularly advantageous in catalyzing the reaction of this invention, is that known as Molecular Sieves of the Y series, the letter Y being employed to distinguish the interatomic structure of this zeolite form from the A and X-type crystals mentioned above. These materials are large void volume zeolites and are stable to heat and acid.

The zeolite catalysts are preferably utilized in the form of beads as opposed to pellets and powders as it has been found that the irregular shape of the bead zeolites provide definite advantages in achieving good results with the process of this invention as the catalytic activity thereof is enhanced by the irregular surfaces thereof.

The molecular sieve zeolites for use in this invention may be prepared by known methods. In general, the preparation may be carried by initially preparing the sodium form and then exchanging the sodium for other cations. Preparation may be for example by heating in aqueous solution an appropriate mixture of oxides, or of materials whose chemical composition can be completely represented as a mixture of oxides $Na_2O$, $Al_2O_3$, $SiO_2$ and $H_2O$ at approximately 100° C. for 15 minutes to 90 hours or more. The product, which crystallizes within this hot mixture, is separated and water washed until the water in equilibrium within the zeolite has a pH within the range of 9 to 12. Dehydration may then be achieved by heating.

Materials of the desired specific structure may be produced by careful control of the $SiO_2/Al_2O_3$, $Na_2O/SiO_2$ and $H_2O/Na_2O$ ratios. Further variations in the composition may be achieved by known methods of exchanging the sodium with other cations.

The temperature employed in this initial zone of the reactor is about 900° F. to 1100° F. with an especially preferred range of 1000° F. to 1050° F. Temperatures lower than those specified result in the dominant formation of mere brominated alkanes whereas higher temperatures result in extreme pyrolysis to produce cyclic derivatives.

The components may be premixed before they are added to the reaction zone or they may be added separately. To insure a thorough and intimate mixing of the components, however, it is generally desirable to premix prior to introduction into the reaction zone. It is also advantageous in most instances to preheat the components, either separately or in admixture, to a temperature below the operating temperature before they are introduced into the reaction zone.

In a preferred embodiment for conducting the reaction, the propane, hydrogen bromide and oxygen are premixed and then introduced into the initial portion of the reaction zone wherein the molecular sieve zeolite alumino silicate catalyst is positioned at a temperature of about 900° F. to 1100° F. In this zone, a combination dehydrogenation and oxybromination reaction occurs which may be called oxydehydro-bromination, whereby the mixture of allyl bromide and propylene is formed.

The effluent gases containing these products pass from the first portion or zone as a mixture and immediately enter the second portion or zone. The second zone is substantially the same as the first except that no catalyst is present. The reaction occurring herein is one of pyrolysis wherein the allyl bromide and propylene are pyrolyzed under the reaction conditions to form allyl radicals which then combine or couple to form 1,5-hexadiene (diallyl).

The temperature maintained in the second zone is about 900° F. to 1100° F. as in the first zone. A preferred temperature for this zone is about 1000° F. to 1050° F.

The pressure employed in either of the first or second portions may range from about subatmospheric to superatmospheric but preferably ranges from about 50 to 300 p.s.i.g. with an especially preferred range of 50 to 90 p.s.i.g.

The residence times required for the reactions in the respective zones will depend, inter alia, on the desired degree of conversion as well as on the nature of the starting materials. For the reactions involving the production of allyl bromide and 1,5-hexadiene, it has found that the desired conversion per pass can be obtained in periods ranging from about 0.1 to about 50 seconds at temperatures of about 900° F. to 1100° F.

The effluent gases exiting the second reaction zone comprise a gaseous mixture of desired 1,5-hexadiene product, unreacted starting materials, hydrogen bromide and water vapor.

The reaction to be effected in the third zone is concerned with the "abnormal addition" of hydrogen bromide to the double bonds of the 1,5-hexadiene to produce the desired 1,6-dibromohexane. By "abnormal addition," is intended to mean in a manner contrary to that prescribed by the so-called Markownikoff Rule. As is well known, the latter "Rule" sets forth the proposition that if an unsymmetrical hydrocarbon combines with a halogen acid, the halogen adds to the carbon atom having the fewer hydrogen atoms. A hydrocarbon is unsymmetrical within the meaning of the rule if the unsaturated linkage divides the compound into two dissimilar groups. Accordingly, "abnormal addition" is descriptive of the condition whereby hydrogen and halogen atoms are added in positions which are interchanged with respect to the mechanism of addition prescribed by the Markownikoff Rule.

According to the present invention, it has been found that the conditions required to effect the "abnormal addition" of the hydrogen bromide may be achieved by maintenance of a supply of oxygen in the reaction zone. It is theorized that the oxygen maintained therein serves to produce free radicals which effectively initiate the desired reaction. It is believed that the oxygen present serves to produce the free radicals by conversion in situ to peroxides. The oxygen is of course, present throughout the entire reaction system and the amount remaining in the effluent gases is sufficient to effectively catalyze the reaction.

Prior to entry of the effluent gases into the third reaction zone, it has been found necessary to remove the water vapor present therein as the hydrogen bromide addition is preferably carried out in the absence of moisture. To remove the water vapor a unique and novel technique is employed. It has been found that the water vapor may be effectively removed by passage of the gases exiting the second zone through a condensing zone maintained at a temperature of about 150° to 200° F., preferably about 165° F. to 190° F. At these temperatures the water vapor present will be condensed and will thereby be removed from the 1,5-hexadiene gaseous effluent which is not condensed. Thus the 1,5-hexadiene is rendered substantially moisture free in order to advantageously carry out the anti-Markownikoff hydrogen bromide addition.

The 1,5-hexadiene, oxygen and hydrogen bromide emanating from the condensing column are then introduced into the third reaction zone which is maintained at a temperature of 140° to 210° F., preferably 150° to 175° F., sufficiently high to maintain the reactants in the gaseous phase.

It is also desirable that additional hydrogen bromide be introduced into the third reaction zone to insure that the reaction goes to substantial completion and this technique represents a preferred embodiment of the present invention. An amount of hydrogen bromide should be introduced so as to have present a stoichiometric excess of about 150 mole percent of the hydrogen bromide in the third portion or zone.

At the conclusion of the reaction, the reactor effluent may be trapped in an ice-cooled receiver after scrubbing out the excess hydrogen bromide. It is contemplated that the recovered hydrogen bromide could be recycled to the third zone in operation of a continuous process.

The following example illustrates the results of the process when proceeding according to the above described method.

EXAMPLE I

The apparatus emyloyed in this example comprised a stainless steel tube sixty inches long having an inside diameter of one inch and having a one-fourth inch outside diameter thermo-well inserted down the center thereof. The tube was inserted into an electrical heater to effect the required heating thereof. The exit end of the tube was connected to a conventional bubble cap condensing column at a point approximately one-third the distance thereof from the top of the column. The column was twenty-four inches long and warm water at a temperature of 160° F. was circulated therethrough to condense the water vapor. The top of the column was attached to an electrically heated glass tube twenty-four inches in length and having a thermowell inserted down the center thereof. A second entrance was provided in the glass tube for the introduction of fresh hydrogen bromide. The interior of the glass reaction tube was also provided with randomly spaced obstacles to secure good intermingling of the reactants.

The catalyst employed for the initial reaction were beads of molecular sieve zeolites having a diameter in angstroms of 13. The catalyst was charged to the initial 30 inches of the stainless steel reactor tube and brought to a temperature of 950° F. while passing a slow stream of hydrogen bromide gas thereover.

Normal-propane at a rate of 0.75 gram per minute, hydrogen bromide at a rate of 1.50 grams per minute and oxygen at a rate of 0.30 gram per minute were passed through rotameters into the head of the reactor for mixing and then into the catalyst-charged portion of the reactor proper. The temperature of this reactor zone was maintained at about 1010° F. with a maximum catalyst bed temperature of 1068° F.

The reaction mixture, after exiting the initial reaction zone, was passed immediately into the second reactor zone where the temperature was maintained at 1022° F. at a pressure of 60 p.s.i.g. for pyrolysis and coupling of the allyl radicals.

The gases emanating from the second zone were then introduced into the condensing column after passage through a pre-cooling section of tubing which permitted the gases to be introduced into the column at about 260° F. In the condenser, the lower temperatures caused condensation of the water vapor which was recovered at the bottom of the column. The volatile gases evolved from the top of the column then entered the third reaction zone maintained at a temperature of about 160° F. In this latter zone additional hydrogen bromide was introduced via a rotameter at a rate of 1.50 grams per minute to supply the additional bromide to preferentially form the 1,6-dibromohexane.

On concluding the reaction the effluent gases were trapped in an ice-cooled receiver and a sample thereof analyzed by gas chromatography. The analytical results are shown below in Table. I.

TABLE I

| Products: | Wt. percent |
|---|---|
| 5-bromohexene-1 | 0.5 |
| 6-bromohexene-1 | 0.6 |
| 2,5-dibromohexane | 4.0 |
| 1,4-dibromohexane | 6.0 |
| 1,5-dibromohexane | 7.5 |
| 1,6-dibromohexane | 56.8 |
| Allyl bromide | 14.1 |
| Propylene | 5.5 |
| Propane | 4.1 |
| Others | 0.9 |

As may be observed from the above analysis, the overall process results in an unexpected and remarkable recovery of the desired 1,6-dibromohexane with varying amounts of other brominated products and starting materials.

The invention has been described with respect to certain preferred embodiments thereof, and there will become obvious to persons skilled in the art, other variations, modification and equivalents which are to be understood as coming within the scope of the present invention and the invention is to be limited only by the scope of the appended claims.

What is claimed is:

1. A continuous three zone reaction process for the production of 1,6-dibromohexane from propane, consisting essentially of (1) an oxy-dehydrobromination zone operating at 900°–1100° F., and containing a catalyst comprising a molecular sieve zeolite aluminosilicate catalyst, (2) a pyrolysis zone operating at 900°–1100° F. and devoid of catalyst, and (3) an abnormal-addition bromination zone operating at 140°–210° F. and devoid of catalyst, and a condensing means between said pyrolysis zone and said abnormal-addition bromination zone which is operated at 150°–210° F., whereby water is stripped from gases leaving said pyrolysis zone, wherein said propane, hydrogen bromide and gas selected from the group consisting of oxygen and air are admitted as initial reactants in stoichiometric proportions into said oxy-dehydrobromination zone, and about 150 mole percent of hydrogen bromide in excess of stoichiometric requirements is admitted into said abnormal-addition bromination zone.

2. A process according to claim 1 wherein the temperature in said first zone of the reactor is maintained at about 1000° to 1050° F., the temperature in the second zone is maintained at about 1000° to about 1050° F. and the temperature in the third zone is maintained at about 140° to 175° F.

3. A process according to claim 2 wherein the molecular sieve Zeolite catalyst has a pore size of about 6 to 15 angstroms.

4. A process according to claim 3 wherein the reactants are premixed prior to entering into the reactor.

5. A process according to claim 1 wherein the gas is molecular oxygen.

References Cited

UNITED STATES PATENTS

| 3,363,010 | 1/1968  | Schwartzenbek | 260—654OXY |
| 3,414,622 | 12/1968 | Hayes         | 260—654OXY |
| 3,407,039 | 10/1968 | Bryant        | 260—659OXY |

OTHER REFERENCES

Chemical Abstracts 68, 21509s (1968).

DANIEL D. HORWITZ, Primary Examiner

U.S. Cl. X.R.

260—654, 659, 680; 252—455